3,213,002
ELECTROLYTIC SEPARATION OF PLUTONIUM
VALUES FROM URANIUM VALUES
Glen E. Benedict, Richland, Wash., assignor to the United
States of America as represented by the United States
Atomic Energy Commission
No Drawing. Filed May 22, 1964, Ser. No. 369,638
5 Claims. (Cl. 204—1.5)

The invention relates to an improved method of electrolytically separating plutonium values from uranium values in a fused salt electrolyte, and the product thereof, more particularly to an improvement in the electrolytic method of making such a separation described in the United States Patent No. 3,011,865 to Glen E. Benedict and Ward L. Lyon, issued on December 5, 1961.

The said Benedict and Lyon patent describes a preferred three-step process of separating plutonium and uranium oxides from each other as follows:

"(1) Dissolving the uranium and plutonium oxides in a molten anhydrous bath of, e.g., sodium and potassium chlorides, while passing anhydrous chlorine and hydrogen chloride through the bath, preferably in the presence of carbon.

"(2) Electrolytically reducing, under oxygen free conditions, a portion of the uranium chlorides thus formed, thereby depositing $UO_2$ on the cathode, while leaving the plutonium and the remaining uranium in solution, then withdrawing the cathode with its deposit of uranium dioxide.

"(3) Sparging the bath with air, inserting fresh electrodes, and again electrolyzing the melt, this time while passing air over the bath. Under these conditions, uranium dioxide and a plutonium compound believed to be plutonium dioxide are codeposited on the cathode. The mixed oxides, which are enriched in plutonium as compared to the starting material, are recovered by withdrawing the cathode from the salt bath and removing the deposit."

The above process has advantages over processes in which aqueous solvents are employed; one of importance is the fact that the thermal neutron moderating effect of water is eliminated, and thus the possibility of accidental nuclear criticality is greatly lessened. However, the process has a serious limitation in that it has a plutonium separation factor of only 1.43; this makes it necessary to repeat its final step many times in order to make even a fairly complete separation of plutonium, and even when the object is only plutonium enrichment several repetitions are required.

A serious practical aggravation of the situation just described arises from the fact that the mixture of plutonium and uranium values with which the invention is concerned is normally the product of fuel irradiation within a nuclear reactor, and hence highly radioactive. This calls for all the operations to be carried out behind shielding by remote control, which greatly adds to their cost. It is therefore evident that if a process could be provided with a larger separation factor for plutonium, very substantial economic savings would ensue.

It is, accordingly, the general object of the invention to provide an economical process of separating plutonium values from uranium values in a fused salt electrolyte.

It is a more particular object to provide such a process having a substantially larger plutonium separation factor than that of such processes now known.

Other objects will appear as the description proceeds.

I have found that by modifying certain parameters of the final electrolytic step of the process of the Benedict-Lyon patent, the plutonium separation factor may be increased by from one to two orders of magnitude as compared to that process, or from about 13 to about 160. These parameter modifications are:

(1) Using a fused salt melt of equal molar LiCl and KCl instead of the KCl-NaCl melt of the patent mentioned.

(2) Carrying out the final electrolytic separation within the temperature range of about 600° to 625° C., instead of at the temperatures of the patent.

(3) Sparging during the final electrolysis with a sparging gas mixture of oxygen and chlorine, the chlorine content being from 20 to 80 percent by volume, and the balance oxygen, at the rate of from about 0.047 to about 0.0517 mole per minute per mole of plutonium and uranium value reactants.

(4) Maintaining the cathode current density within the range of 0.04 to 0.2 ampere per square centimeter.

The exceptionally small current densities of the present process result in longer periods of time being required to carry it out than are necessary in the process of the patent, but the results make it well worth while. In addition to the higher separation factors achieved, the product also is superior from the standpoint of greater density and improved crystal structure. The product of the patent is merely a codeposition of $UO_2$ and $PuO_2$, whereas that of the present process is a true solid solution of the two oxides, which is more desirable for use as a nuclear fuel. The greater density of the product of the present invention is highly desirable for use as a nuclear reactor fuel because of the higher power level which it makes possible, and a corresponding gain in reactor efficiency.

Theories have been advanced to explain why my present improved process achieves its results, but since none of these have been rigorously established it would serve no useful purpose to set them forth at the present time. Conjectures as to which of the parameter adjustments bring about particular improvements have, in some cases, considerable evidence in their favor, but for purposes of the present writing, my invention is offered empirically, on the basis of experiments which will be described in the following examples.

*Example I*

45.8 grams of $UO_2Cl_2$ and 0.55 gram of $PuCl_3$ were placed in an electrolytic cell having a cylindrical containing vessel of Vycor, a chemically inert ceramic, with an inside diameter of 45 mm. The cell electrolyte was a melt of 42.4 grams of LiCl and 74.6 grams of KCl, the last two quantities being equimolar. The anode of the cell was a ¼" carbon rod and the cathode a ⅛" carbon rod having a surface area of 2.5 cm.$^2$, the electrodes being separated by a distance of 2 centimeters. A sparging gas tube had its outlet midway between the anode and the cathode, about 2 centimeters below the cathode. During the entire electrolysis, a flow was maintained of a sparging gas consisting of 20 percent $Cl_2$ and 80 percent $O_2$ by volume. The flow was at the rate of 150 milliliters per minute, or about 0.0492 mole per minute of sparging gas per mole of reactants, $UO_2Cl_2$ and $PuCl_3$.

The electrolysis was accomplished by a direct constant cell current of 0.5 ampere, which was equivalent to a cathode current density of 0.2 amp./cm.$^2$. The electrolysis lasted for 4 hours, during which time the flow of sparging gas was maintained as described above, and the cell temperature was maintained at 625° C.

At the conclusion of the electrolysis the cathode was removed and its adherent product examined physically and chemically. It was found that about 5 percent of the uranium values in the melt had been removed and about 68 percent of the plutonium values, or by a separation factor for plutonium of 13.6.

An X-ray diffraction pattern was made of the deposit and showed an absence of peaks at the angular location of peaks normally found for $PuO_2$. The angle of the $UO_2$ peaks was slightly displaced toward the theoretical $PuO_2$ angles, thus indicating the existence of a solid solution of $PuO_2$ in $UO_2$. In contrast, similar X-ray procedures on the product of the Benedict and Lyon patent showed both $PuO_2$ and $UO_2$ peaks at their theoretical angles, thus indicating a codeposition of these two compounds in an undissolved mixture.

Density measurements were made of the product of the present process, and its bulk density was found to be 6.3 grams per cubic centimeter. In contrast, the product of the Benedict and Lyon patent is only 3.8 grams per cubic centimeter.

*Example II*

42.6 grams of $UO_2Cl_2$ and 1.6 grams of $PuCl_3$ were placed in an electrolytic cell similar to the cell in Example I and with an electrolyte of the same weight and composition as in Example I. The anode of the cell was a ¼" carbon rod and the cathode a ⅛" carbon rod having a surface area of 3.0 cm.², the electrodes being separated by a distance of 2 cm. The sparging gas outlet was placed as in Example I. The sparking gas was 50% $Cl_2$ and 50% $O_2$ and its rate of flow was the same as in Example I, 150 ml./min., but due to the smaller amounts of the reactants used in this example the molar ratio of the sparging gas to them was somewhat greater, 0.0517 mole per minute per mole of reactants.

The electrolysis was carried out by a direct constant cell current of 0.3 ampere, or a current density of 0.1 amp./cm.². The electrolysis lasted 5 hours, during which time the sparging gas flow was maintained as described in the preceding paragraphs, and the cell temperature was maintained at 600° C.

At the conclusion of the electrolysis the cathode was removed and its adherent product was examined as in Example I. It was found that about 7 percent of the uranium had been removed and about 91 percent of the plutonium, or that the plutonium separation factor was about 13.

The bulk density of the product was 6.3 grams per cubic centimeter.

X-ray diffraction studies gave similar results to those described in Example I.

*Example III*

50.0 grams of $UO_2Cl_2$ and 0.69 gram of $PuCl_3$ were placed in an electrolytic cell of the same dimensions and having an electrolyte of the same weight and composition as in Examples I and II; namely, 42.4 grams of LiCl and 74.6 grams of KCl. The anode was a ¼" carbon rod and the cathode a sheet of platinum 2.5 cm. by 1.0 cm. and 0.01 cm. thick. The anode and cathode were 2 cm. apart and the sparging gas outlet was midway between them, 2 cm. below the cathode. The sparging gas was 80% $Cl_2$ and 20% $O_2$ and its rate of flow was the same as in the previous examples, 150 ml./min., but due to the fact that amount of reactants used in this example exceeded that of the previous examples the molar ratio of the sparging gas to the reactants was smaller; namely, 0.047 mole of gas per minute per mole of reactants.

The electrolysis was carried out by a direct constant cell current of 0.2 ampere, which was equivalent to a cathode current density of 0.04 amp./cm.². The electrolysis lasted for 8 hours, during which time the flow of sparging gas was maintained as described in the preceding paragraph, and the temperature was maintained at 600° C.

At the conclusion of the electrolysis the cathode was removed and its adherent deposit was examined as in Examples I and II. It was found that 64 percent of the plutonium had been removed, and only 0.4 percent of the uranium, or that a separation factor for plutonium of about 160 had been achieved.

The bulk density of the product was 6.3 grams per cubic centimeter.

X-ray diffraction studies gave similar results to those of Examples I and II.

It will be understood that the invention is not to be limited to the details given herein but that it may be modified within the scope of the appended claims.

The embodiments of the invention in which an exclusive property or privilege is claimed are defined as follows:

1. A method of separating plutonium values from uranium values in a fused salt melt, comprising placing an anode and a cathode within the melt and passing a direct current therebetween through the melt sufficient to maintain a cathode current density of from about 0.04 to about 0.2 ampere per square centimeter, while maintaining the temperature of the melt at from about 600° C. to about 625° C. and sparging the melt with a gas mixture consisting of from 20 to 80 percent chlorine by volume and the balance oxygen, and withdrawing the resulting solids deposited on the cathode from the melt.

2. The method of claim 1 where the plutonium values are in the form of $PuCl_3$, the uranium values are in the form of $UO_2Cl_2$, and the melt is an equimolar mixture of LiCl and KCl.

3. The method of claim 1 where the sparging gas is passed through the melt about midway between the anode and the cathode.

4. The method of claim 1 where the sparging gas is passed through the melt at the rate of from about 0.047 to about 0.0517 mole per minute per mole of plutonium and uranium value reactants.

5. A solid solution of $PuO_2$ within $UO_2$ characterized by a bulk density of about 6.3 grams per cubic centimeter made by the method of claim 1.

References Cited by the Examiner

UNITED STATES PATENTS

| | | | |
|---|---|---|---|
| 3,011,865 | 12/61 | Benedict | 23—14.5 |
| 3,024,172 | 3/62 | McLain et al. | 204—1.5 |
| 3,063,923 | 11/62 | Mayer | 252—301.1 |
| 3,114,682 | 12/63 | Scott et al. | 204—1.5 |
| 3,126,349 | 3/64 | Kirchner | 252—301.1 |

References Cited by the Applicant

UNITED STATES PATENTS

| | | |
|---|---|---|
| 3,011,865 | 12/61 | Benedict et al. |
| 3,030,176 | 4/62 | Lyon et al. |

REUBEN EPSTEIN, *Primary Examiner.*